United States Patent [19]
Lehmann

[11] 4,058,878
[45] Nov. 22, 1977

[54] CONTROLLED DEFLECTION ROLL

[75] Inventor: Rolf Lehmann, Mutschellen AG, Switzerland

[73] Assignee: Escher Wyss Limited, Zurich, Switzerland

[21] Appl. No.: 768,473

[22] Filed: Feb. 14, 1977

[30] Foreign Application Priority Data

Mar. 1, 1976 Switzerland ............... 2492/76

[51] Int. Cl.² ............................................. B21B 13/02
[52] U.S. Cl. ............................................... 29/116 AD
[58] Field of Search ...... 29/116 AD, 113 AD, 116 R, 29/113 R

[56] References Cited

U.S. PATENT DOCUMENTS

| 3,131,625 | 5/1964 | Küsters et al. ............ 29/116 AD X |
| 3,389,450 | 6/1968 | Robertson .................. 29/116 AD |
| 3,624,880 | 12/1971 | Justus et al. ................ 29/116 AD |
| 3,726,338 | 4/1973 | Sorenson ................... 29/116 AD X |
| 3,802,044 | 4/1974 | Spillmann et al. ........... 29/113 AD |
| 3,885,283 | 5/1975 | Biondetti .................... 29/116 AD |

FOREIGN PATENT DOCUMENTS 6,509,484   4/1966   Netherlands ............... 29/113 AD

*Primary Examiner*—Alfred R. Guest
*Attorney, Agent, or Firm*—Werner W. Kleeman

[57] ABSTRACT

A controlled deflection roll comprising a stationary support and a substantially tubular-shaped roll shell rotatable about said support. Between the support and the roll shell there are arranged a number of movable piston-like hydrostatic pressure elements having contact surfaces serving to support the roll shell. The invention contemplates providing the pressure elements with substantially flat side surfaces extending in the direction of movement of the pressure elements. The side surfaces of neighboring pressure elements disposed at the same side thereof are located in a common plane. In order to connect neighboring pressure elements there are provided connection components having resilient flaps or tabs which bear against the flat side surfaces of at least two neighboring pressure elements.

11 Claims, 8 Drawing Figures

CONTROLLED DEFLECTION ROLL

BACKGROUND OF THE INVENTION

The present invention relates to a new and improved construction of controlled deflection roll of the type comprising a stationary support and a substantially tubular-shaped roll shell rotatable about such support.

In particular, the controlled deflection roll of the present invention — also sometimes referred to in the art as rolls with bending compensation — possesses a plurality of piston-like hydrostatic pressure elements arranged between the support and the roll shell, these pressure elements having contact surfaces serving to support such roll shell. Further, the pressure elements together with parts arranged at the support or portions of the support delimit or bound hydraulic cylinder chambers of substantially round cross-section in which there is immersed in each case a piston-like component, and the cylinder chambers are connected with at least one source of a pressurized fluid medium.

With controlled deflection rolls of the aforementioned construction, such as for instance taught in the commonly assigned U.S. Pat. No. 3,802,044 of Werner Spillman, Alfred Christ, Rolf Lehmann, the inventor of the controlled deflection roll of this disclosure, and Erwin Meuehle, it is necessary to secure the individual pressure elements against rotation at the support, so that they assume a position in which the cylindrical contact surfaces of the pressure elements can bear as accurately as possible at the cylindrical inner surface of the roll shell. Any such rotation would lead to edge compression of the pressure elements at the roll shell, which could lead to damage of the pressure elements and the roll shell.

With the prior art controlled deflection roll short rods are provided for securing the mutual position of the pressure elements. These rods engage into lateral bores of neighboring elements. The bores are structured at the elements such that they are located along a straight line if the elements are dispositioned in a row. Significant in this regard is the construction taught, for instance, in column 6, lines 22 and 23 of the aforementioned U.S. Pat. No. 3,802,044, the disclosure of which patent is incorporated herein by reference.

Utilizing rods and bores as contemplated by the prior art is both complicated and of even greater significance associated with extreme assembly difficulties. Since mutual mobility of the pressure elements must be ensured, play must be provided between the bores and the ends of the rods, impairing the accuracy of the guiding action.

SUMMARY OF THE INVENTION

Hence, with the foregoing in mind it is a primary object of the present invention to provide an improved construction of controlled deflection roll which is not associated with the aforementioned drawbacks and limitations of the prior art proposals.

Another and more specific object of the present invention aims at the provision of a novel construction of controlled deflection roll of the previously mentioned type, wherein it is possible to obtain, with greater accuracy than heretofore possible and with the use of extremely simple means, an exact positioning of the individual pressure elements in relation to the support and the roll shell, and furthermore, the assembly or mounting work is appreciably simplified.

Now in order to implement these and still further objects of the invention, which will become more readily apparent as the description proceeds, the controlled pressure roll of the present development is manifested by the features that the pressure elements are provided with substantially flat side surfaces which extend in the direction of movement of the pressure elements. At each side of such pressure elements the side surfaces of neighboring pressure elements are disposed in a common plane. In order to interconnect neighboring pressure elements there are provided connection components or elements having resilient flaps or tabs which bear against the flat side surfaces of at least two neighboring pressure elements.

The invention contemplates maintaining the individual pressure elements in their proper position by means of such elastic contact flaps, tongues or equivalent structure which bear from the outside against the side surfaces. Consequently, there is obtained, on the one hand, the aforementioned simplification and economies of the construction, and, on the other hand, there is also realized a saving in the assembly work, since the individual pressure elements can be simply shifted into their position independently of one another.

Each pressure element preferably possesses two substantially parallel, flat side surfaces, and the connection components can be constructed in the form of substantially U-shaped profile elements, wherein the resilient flaps form the legs of each such U-shaped profile element. Hence, there is produced a particularly simple construction, since each connection component engages the pressure element which it connects from opposite sides thereof, and thus, requires neither attachment nor supporting at the support.

Thus, the connection components or elements can be preferably provided at their web portion or web with openings, each of which is intended to encircle or surround a piston-like part of an associated hydrostatic pressure element. With such type construction the connection components, during the assembly work, can be simply placed together with their openings at the intended locations of the pressure elements at the support, whereupon the pressure elements can be brought into their desired position.

Each section or portion of the connection component intended to coact with a pressure element thus can be equipped with at least four flaps or tongues, forming two pairs which clampingly work towards one another. With such construction of the connection component two flaps of a connection component press against each flat side surface. Such construction is particularly advantageous in those instances where the connection components are fabricated from spring steel, which should be hardened after the machining or other processing work thereof. By separating a large flap into two small flaps the effect of the deformation during hardening is reduced.

Moreover, as has been taught to the art from U.S. Pat. No. 3,802,044, the contact surfaces of the hydrostatic pressure elements preferably can possess a number of hydrostatic bearing pockets which are connected with the associated cylinder chamber or compartment independent of one another by throttle channels, and the pressure elements are guided to be linearly movable and inclinable at the support. The connection components are especially suitable for this construction of roll, since they fixedly clamp themselves at the pressure elements and thus can follow their movements, especially their inclined movements.

BRIEF DESCRIPTION OF THE DRAWINGS

The invention will be better understood and objects other than those set forth above, will become apparant when consideration is given to the following detailed description thereof. Such description makes reference to the annexed drawings wherein.

DETAILED DESCRIPTION OF THE PREFERRED EMBODIMENTS

Figure 1:
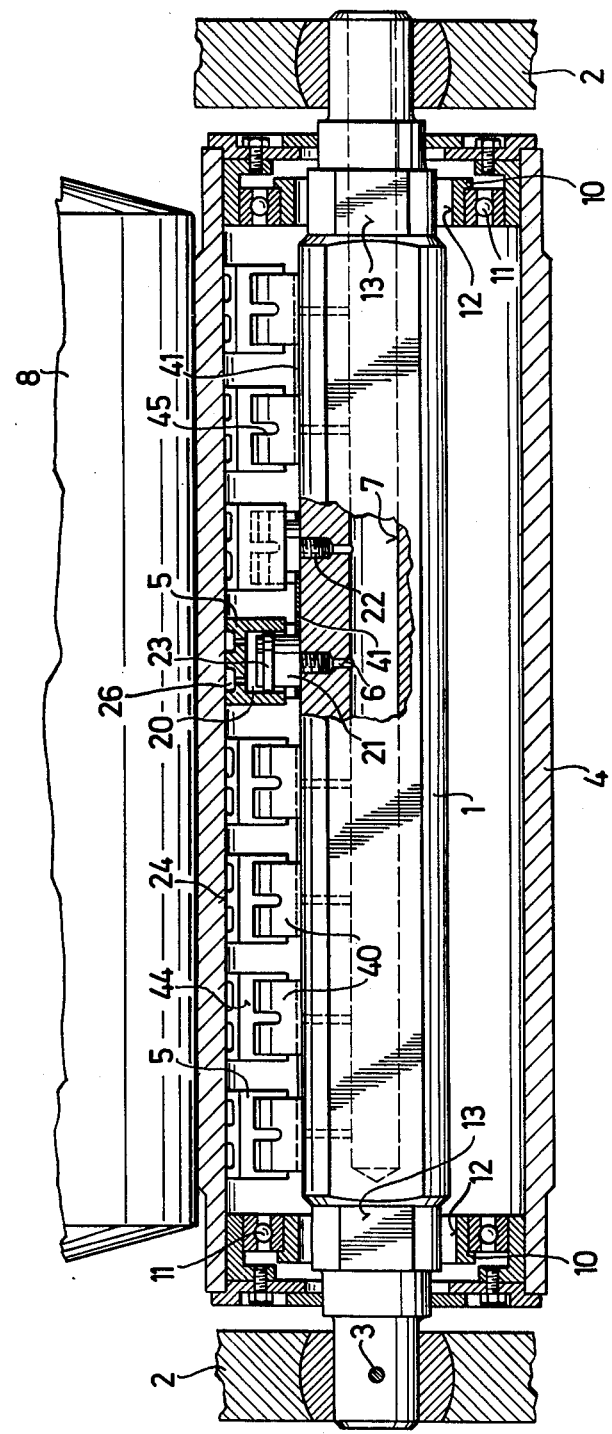
FIG. 1 is an axial sectional view through a controlled deflection roll constructed according to the teachings of the present invention.

Describing now the drawings, FIG. 1 shows by way of example a first embodiment of controlled deflection roll constructed according to the present invention, which is of the type having a stationary support 1, the opposite ends of which are mounted in a frame 2. The ends of the support 1, which is shown as a stepped shaft, are prevented from rotating relative to the frame 2 by means of, for instance, a pin 3 or equivalent structure.

Figure 2:
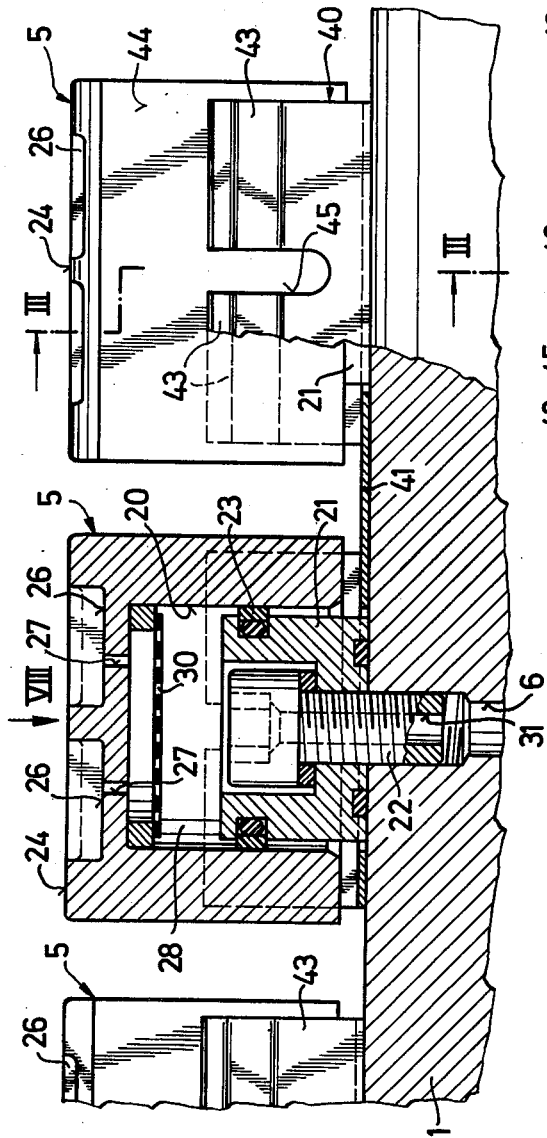
FIG. 2 is an enlarged sectional detail of the controlled deflection roll shown in FIG. 1.

Arranged to rotate about the support 1 is a substantially cylindrical tubular-shaped shell 4 which is supported upon hydrostatic pressure or support elements 5 arranged in a row. These pressure or support elements 5, which will be described more fully in conjunction with FIG. 2, are connected by means of supply or delivery channels 6 and 7 provided in the support 1 with a not particularly illustrated, conventional source of a hydraulic pressurized fluid medium. The roll shell 4 is urged by means of the pressure elements 5 against a counter roll 8. Roll shell 4 is guided at its ends opposite the support 1 by means of the guide discs 10 which are rotatably mounted upon roller bearings 11 provided in the roll shell 4. The guide discs 10 are equipped with elongate openings 12 having two substantially parallel flat surfaces which coact with substantially parallel flat surfaces 13 of the support 1. Such type construction, which allows movement of the shell 4 in the plane of the pressure elements 5, is known from U.S. Pat. No. 3,885,283, the disclosure of which is incorporated herein by reference.

Figure 3:
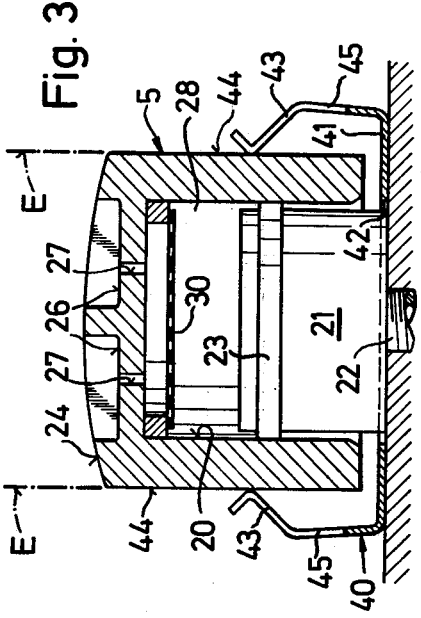
FIG. 3 is a cross-sectional view, taken substantially along the line III—III of FIG. 2.

Now in FIG. 2 the pressure elements 5 have been shown on an enlarged scale. With such embodiment as shown in FIGS. 2 and 3 the pressure elements 5 contain internal bores 20 into which engage substantially piston-like projections 21 which are secured by screws 22 or equivalent structure at the support 1. Between the projections 21 and the pressure elements 5 there are located seals 23 which seal the gap between the projections 21 and the bores 20. The seals 20 also allow inclination of the pressure elements 5 relative to the support 1.

As best seen by referring to FIG. 2, the pressure elements 5 contain contact or bearing surfaces 24 at which there are formed hydrostatic bearing pockets 26. In the instant case four bearing pockets 26 are provided at each pressure element 5. These bearing pockets 26 are connected independently of one another by means of throttle channels 27 with the cylinder chamber 28 provided in the associated bore 20. In order to prevent clogging of the throttle channels 27 there is provided a sieve or filter 30 in each pressure element 5. The cylinder chambers or compartments 28 are connected by bores 31 provided in the screws 22 with the channels 6 for the hydraulic pressurized fluid medium.

During operation, the hydraulic pressurized fluid medium or pressure medium effective in each cylinder chamber 28 forces the corresponding pressure element 5 against the roll shell 4 and such against the counter roll 8. At the same time the pressure medium flows through the channels 27 into the bearing pockets 26 in which there is maintained a hydrostatic pressure. By means of this hydrostatic pressure there is prevented undesirable metal to metal contact between the relevant pressure elements 5 and the roll shell 4. This operation is described in considerable detail in the aforementioned U.S. Pat. No. 3,802,044.

Figure 7:
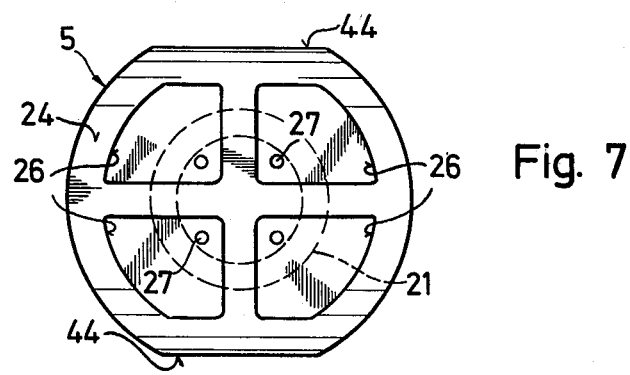
FIG. 7 is a view looking in the direction of the arrow VIII of FIG. 2.

According to important aspects of the present invention, neighboring pressure elements 5 are interconnected by a connection component or element 40 which, as best seen by referring to FIG. 3, is in the form of a profile or structural member having a substantially U-shaped cross-section. The connection component 40 contains a web 41 in which there are formed substantially round or circular openings 42 for piercingly receiving the projections 21. Additionally, the connection component 40 contains resilient flaps or tongues 43 which are provided for the purpose of exerting a supporting action at the flat side or lateral surfaces 44 of the associated pressure element 5. Each pressure element 5 thus contains two flat side surfaces 44, as best seen by referring to FIG. 7, which extend in the direction of movement of such pressure element. For all of the pressure elements 5 such side surfaces 44 are located at the same spacing from the lengthwise axis of such pressure elements. With an arrangement of the pressure elements 5 disposed in a straight line, therefor in the operating position thereof, the side surfaces 44 of all pressure elements 5 are disposed in substantially parallel planes E, as indicated in FIG. 3.

It should be readily understood that the side surfaces 44 must be arranged in such a manner that in this position the camber or arching of the contact surfaces 24 in each case corresponds to the camber or arching of the roll shell 4, i.e. both axes of the cylindrical domed or arched portions extend coaxially or parallelly to one another.

Figure 4:
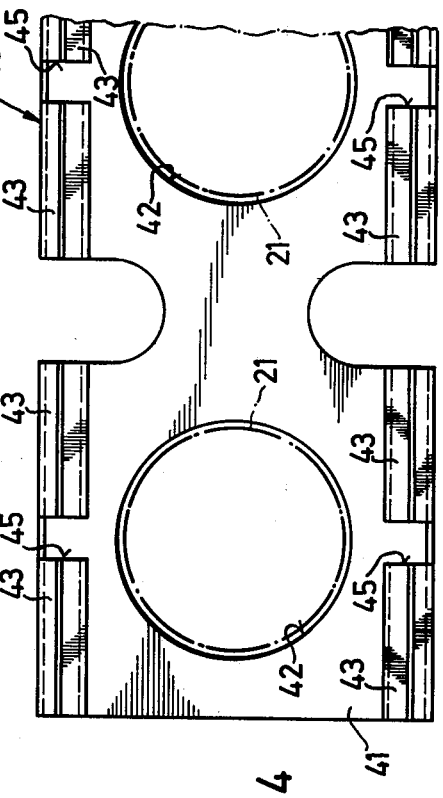
FIG. 4 is a top view of the connection component used in the arrangement of FIG. 2.

From the illustration of FIGS. 2 and 4 it will be recognized that at each such side surface 44 of a pressure element 5 there bear two contact flaps or tongues 43 of the connection component 40. These flaps 43 are separated from one another by a cutout or recess 45 or equivalent structure.

The connection components or elements can be preferably constructed such that they are initially stamped from a spring material, thereafter deformed, and then finally hardened. During hardening there are produced unavoidable deformations of the flaps or tongues 43 which have a lesser detrimental effect upon the guiding of the pressure elements, with the illustrated embodiment, than if the cutouts 45 were not provided and two neighboring flaps 43 would form one piece.

Figure 5:
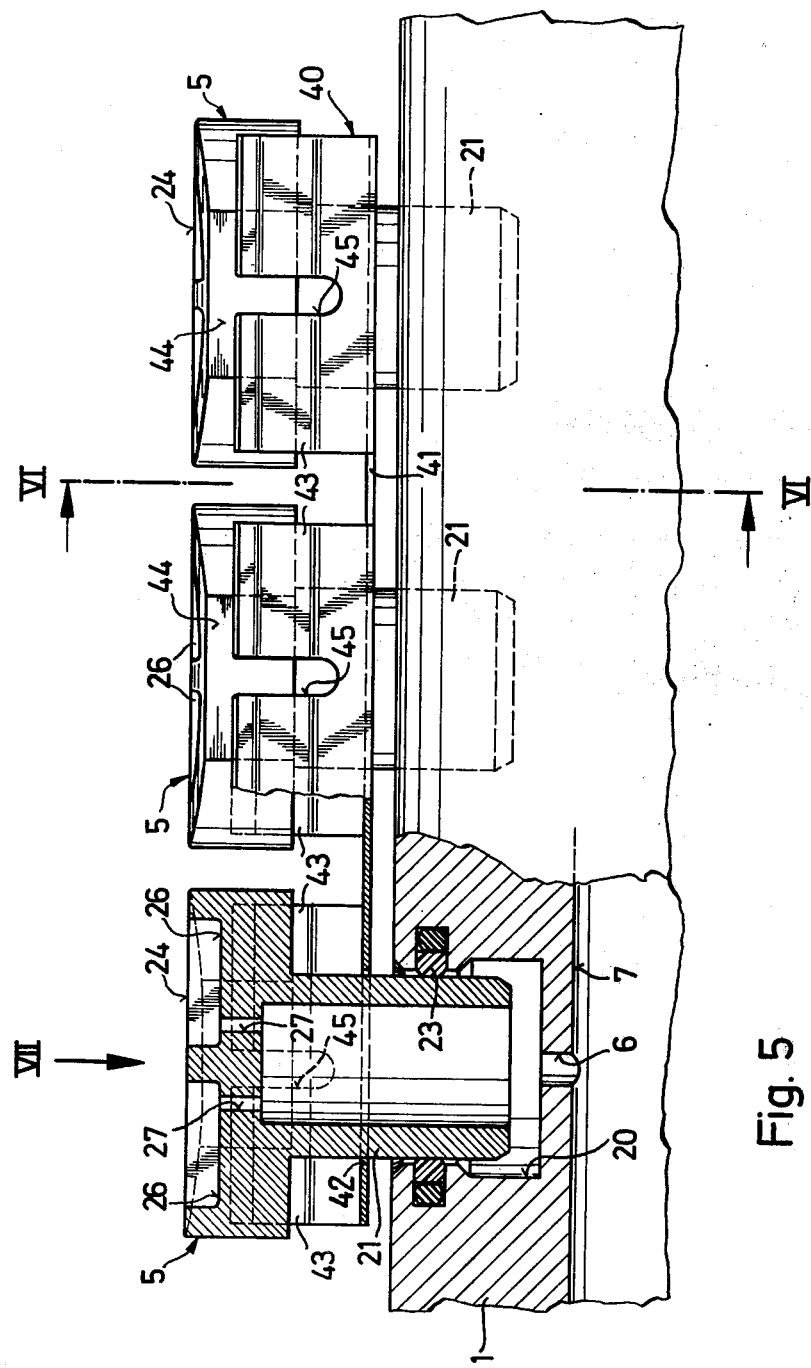
FIG. 5 illustrates a modified construction of the roll, corresponding to the detail sectional showing of FIG. 2.
Figure 6:
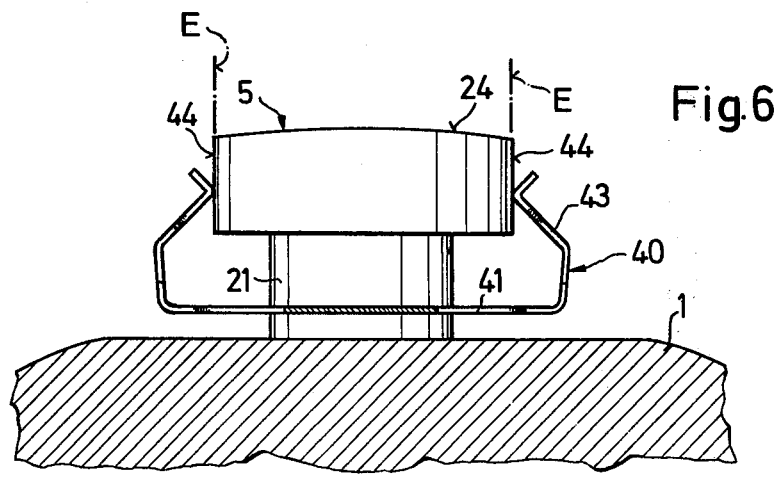
FIG. 6 is a cross-sectional view of the arrangement of FIG. 5 taken substantially along the line VI—VI thereof.

FIGS. 5 and 6 show utilization of the principles of the invention with a controlled deflection roll having a different construction of the pressure elements 5. The connection component or element 40 is essentially the same in construction as for the embodiment of FIGS. 2 to 4 and differs therefrom only inasmuch as it extends over three pressure elements.

Figure 8:
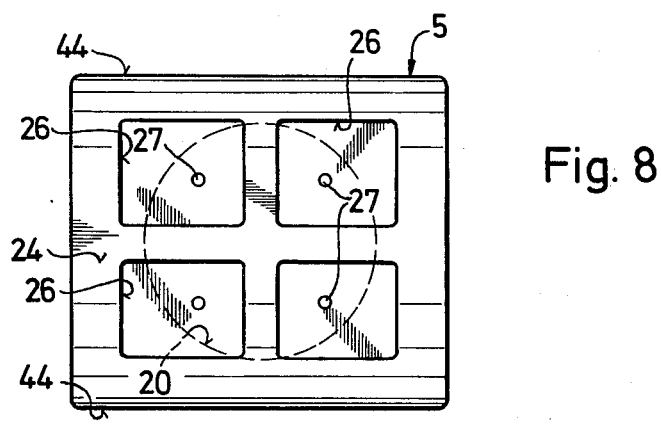
FIG. 8 is a view looking in the direction of the arrow VII of FIG. 5.

Turning attention more specifically to the showing of FIGS. 5 and 6 it will be understood that parts or components corresponding to those illustrated and discussed previously in conjunction with FIGS. 2 and 4 have been conveniently designated with the same reference characters. Thus, with the embodiment of FIGS. 5 and 6 the cylindric bores 20 are formed in the support 1 and are likewise connected by the supply or delivery channels 6 and 7 with the source of pressurized fluid medium. The piston-like projections 21 are here arranged at the pressure elements 5, and between such projections 21 and the wall of the relevant bore 20 there is located in each case the seals 23. Also in this arrangement the pressure elements 5 are provided with substantially parallel flat side surfaces 44, as best seen by referring to FIG. 8, at which engage the flaps or tongues 43 of the connection components or elements 40.

The side or lateral surfaces 44 of the pressure elements 5 and equally the connection components 40 can be fabricated without difficulty and at reduced cost. During assembly it is sufficient, prior to mounting of the pressure elements 5, to arrange the connection components 40 at the support 1 and thereafter to introduce the pressure elements 5 between the flaps or tongues 43. With the embodiment according to FIGS. 2 and 3 each pressure element 5 with its bore 20 is pushed onto the associated piston-like component 21. With the embodiment of FIGS. 5 and 6 each pressure element 5 is pushed by means of its piston-like projection 21 through the relevant opening 42 and the bore 20 containing the seal means or seals 23.

It will be understood that the connection component or element 40 also can be manufactured from a material other than hardened steel, for instance, spring bronze. In this case the cutouts 45 are not needed.

While there are shown and described present preferred embodiments of the invention, it is to be distinctly understood that the invention is not limited thereto, but may be otherwise variously embodied and practiced within the scope of the following claims.

Accordingly, what I claim is:

1. A controlled deflection roll comprising:
a stationary support;
a substantially tubular-shaped roll shell;
means for mounting said substantially tubular-shaped roll shell to be rotatable about said stationary support;
a plurality of movable substantially piston-like hydrostatic pressure elements located between said stationary support and said roll shell;
said pressure elements including contact surface means which serve to support the roll shell;
said pressure elements having substantially flat side surfaces extending in the direction of movement of said pressure elements;
said side surfaces of neighboring pressure elements being located in substantially a common plane;
connection means for connecting neighboring pressure elements;
said connection means comprising resilient flaps which bear against the flat side surfaces of at least two neighboring pressure elements.

2. The controlled deflection roll as defined in claim 1, wherein:
each pressure element contains two substantially parallel flat side surfaces;
said connection means comprising a connection component in the form of a substantially U-shaped profile member having legs;
said resilient flaps forming said legs of such substantially U-shaped profile member.

3. The controlled deflection roll as defined in claim 2, wherein:
said connection component further includes a web disposed between said legs;
each hydrostatic pressure element including a substantially piston-shaped portion;
said web having at least one opening for receiving and surrounding said piston-shaped portion of an associated hydrostatic pressure element.

4. The controlled deflection roll as defined in claim 3, wherein:
said connection component includes a portion thereof coacting with its associated pressure element and comprising at least four of said resilient flaps;
said four resilient flaps being dispositioned to form two pairs of flaps which operate towards one another for clampingly engaging the associated hydrostatic pressure element.

5. The controlled deflection roll as defined in claim 1 further including:
means providing a cylinder chamber for each hydrostatic pressure element;
the contact surface means of each hydrostatic pressure element being provided with a plurality of hydrostatic bearing pockets;
throttle channels for flow connecting the bearing pockets independently of one another with the cylinder chamber of the associated hydrostatic pressure element; and
said support guiding the pressure elements so as to be linearly movable and inclinable thereat.

6. The controlled deflection roll as defined in claim 5, wherein:
said means providing a cylinder chamber for each hydrostatic pressure element comprises a bore provided at said support for each hydrostatic pressure element;
each said hydrostatic pressure element being slideably received in the associated bore of said support.

7. The controlled deflection roll as defined in claim 5, wherein:
said means providing a cylinder chamber for each hydrostatic pressure element comprises:
a bore provided at each hydrostatic pressure element;
a piston-like projection carried by said support for receiving the bore of the associated hydrostatic pressure element.

8. The controlled deflection roll as defined in claim 1, wherein:
each pair of resilient flaps has disposed therebetween a cut out portion.

9. A controlled deflection roll comprising:
a stationary support;

a roll shell;

means for mounting said roll shell to be rotatable about said stationary support;

a plurality of movable hydrostatic pressure elements located between said support and said roll shell for supporting said roll shell;

each of said pressure elements having a pair of oppositely situated side surfaces extending substantially in the direction of movement of said movable pressure element;

each of said side surfaces of neighboring pressure elements which are disposed to the same side of said neighboring pressure elements being located in a respective substantially common plane;

connection means for connecting neighboring pressure elements;

said connection means including oppositely situated resilient flaps which bear against the side surfaces of at least two neighboring pressure elements.

10. The controlled deflection roll as defined in claim 9, wherein:

said resilient flaps comprise two pairs of oppositely situated flaps for clampingly engaging the oppositely situated side surfaces of the associated pressure element.

11. The controlled deflection roll as defined in claim 10, wherein:

each pair of resilient flaps has disposed therebetween a cut out portion.

* * * * *